US009481244B1

(12) United States Patent
Koehler et al.

(10) Patent No.: US 9,481,244 B1
(45) Date of Patent: Nov. 1, 2016

(54) FRICTION DRIVE SYSTEM FOR A UTILITY MACHINE (71) Applicant: Ariens Company, Brillion, WI (US)

(72) Inventors: Scot A. Koehler, Appleton, WI (US); Kyle T. Roggenkamp, De Pere, WI (US); Perry L. Prochnow, Brillion, WI (US)

(73) Assignee: Ariens Company, Brillion, WI (US)

( * ) Notice: Subject to any disclaimer, the term of this patent is extended or adjusted under 35 U.S.C. 154(b) by 31 days.

(21) Appl. No.: 14/734,867

(22) Filed: Jun. 9, 2015

(51) Int. Cl.
*B60K 25/06* (2006.01)
*E01H 5/09* (2006.01)
*E01H 5/04* (2006.01)

(52) U.S. Cl.
CPC ............... *B60K 25/06* (2013.01); *E01H 5/04* (2013.01); *E01H 5/045* (2013.01); *E01H 5/098* (2013.01); *Y10T 74/20213* (2015.01)

(58) Field of Classification Search
CPC ....... B60K 25/06; E01H 5/045; E01H 5/098; E01H 5/04; Y10T 74/20213
USPC ......................................................... 180/347
See application file for complete search history.

(56) References Cited

U.S. PATENT DOCUMENTS

| 844,011 A | 2/1907 | Fischer |
| 844,863 A | 2/1907 | Groesbeck et al. |
| 1,042,167 A | 10/1912 | Stump |
| 1,133,690 A | 3/1915 | Woodhull |
| 1,147,268 A | 7/1915 | Rogers |
| 1,336,581 A | 4/1920 | Plettner et al. |
| 2,448,074 A | 8/1948 | Bishop |
| 3,038,288 A | 6/1962 | Deptula et al. |
| 3,059,397 A | 10/1962 | Anderson et al. |
| 3,445,991 A | 5/1969 | Hanson et al. |
| 3,473,622 A * | 10/1969 | Orr ..................... B62D 49/0671 476/30 |
| 3,527,112 A | 9/1970 | Korell |
| 3,529,482 A | 9/1970 | Jackson et al. |
| 3,580,351 A | 5/1971 | Mollen |
| 3,613,814 A | 10/1971 | Prien, Jr. |
| 3,667,304 A | 6/1972 | Puffer et al. |
| 3,678,770 A | 7/1972 | Enters et al. |
| 3,706,363 A | 12/1972 | Niles |
| 3,795,094 A | 3/1974 | Mollen et al. |
| 3,839,919 A | 10/1974 | Mollen et al. |
| 3,934,670 A | 1/1976 | Medalen |
| 4,169,392 A | 10/1979 | McDonald |
| 4,173,153 A | 11/1979 | Klug et al. |
| 4,318,266 A | 3/1982 | Taube |
| 4,457,086 A * | 7/1984 | Bacon ....................... E01H 5/04 192/3.54 |
| 4,498,552 A | 2/1985 | Rouse |
| 4,502,344 A | 3/1985 | Klug |
| 4,580,669 A | 4/1986 | Marto |

(Continued)

*Primary Examiner* — Faye M Fleming
(74) *Attorney, Agent, or Firm* — Michael Best & Friedrich LLP (57) ABSTRACT

A utility machine including a frame, a prime mover supported by the frame, a pair of wheels rotatably coupled to the frame, a drive disk coupled to the prime mover to be driven by the prime mover, and a friction disk assembly. The friction disk assembly includes a friction disk in engagement with the drive disk for transmitting rotation of the drive disk to the pair of wheels, and a carrier disk coupled to the friction disk for rotation therewith. The utility machine also includes a shifter mechanism including a bearing disposed directly between the friction disk and the carrier disk. The shifter mechanism is operable to move the friction disk assembly with respect to the drive disk to selectively vary a drive speed of the pair of wheels.

20 Claims, 5 Drawing Sheets

(56) References Cited

U.S. PATENT DOCUMENTS

| | | |
|---|---|---|
| 4,739,850 A | 4/1988 | Fujioka |
| 5,353,578 A | 10/1994 | Irby et al. |
| 5,784,870 A | 7/1998 | Seegert et al. |
| 5,911,672 A | 6/1999 | Schaedler et al. |
| 6,502,335 B2 * | 1/2003 | Prochnow ............... F16D 13/22 37/244 |
| 6,502,337 B1 | 1/2003 | Ochi |
| 8,281,914 B2 | 10/2012 | Wians et al. |
| 9,010,077 B2 | 4/2015 | Elder et al. |
| 2007/0277404 A1 | 12/2007 | Lun |

* cited by examiner

FRICTION DRIVE SYSTEM FOR A UTILITY MACHINE

BACKGROUND

The present invention relates to self-propelled utility machines and, more particularly, to friction drive systems for utility machines.

Utility machines (e.g., lawn mowers, lawn tractors, trimmers, tillers, snow throwers, etc.) are generally used for outdoor applications such as landscaping, gardening, lawn care, or snow removal. A utility machine usually includes an engine and a means for transferring power from the engine to wheels to propel the machine. Some utility machines include friction drive systems to transfer power from the engines to the wheels. A friction drive system commonly includes two disks to transfer motion from the engine to the wheels: a drive disk that is connected to and driven by the engine, and a friction disk that contacts the drive disk and is connected to the wheels. The friction disk rotates at different speeds depending on where the friction disk contacts the drive disk. A user can adjust the rotational speed of the wheels by moving the friction disk relative a center point to the drive disk. Mechanisms for moving friction disks, however, are typically complex and cumbersome to assemble.

SUMMARY OF THE INVENTION

In one aspect, the invention provides a utility machine including a frame, a prime mover supported by the frame, a pair of wheels rotatably coupled to the frame, a drive disk coupled to the prime mover to be driven by the prime mover, and a friction disk assembly. The friction disk assembly includes a friction disk in engagement with the drive disk for transmitting rotation of the drive disk to the pair of wheels, and a carrier disk coupled to the friction disk for rotation therewith. The utility machine also includes a shifter mechanism including a bearing disposed directly between the friction disk and the carrier disk. The shifter mechanism is operable to move the friction disk assembly with respect to the drive disk to selectively vary a drive speed of the pair of wheels.

In another aspect, the invention provides a utility machine including a frame, a prime mover supported by the frame, a pair of wheels rotatably coupled to the frame, a drive disk coupled to the prime mover to be driven by the prime mover, and a friction disk assembly. The friction disk assembly includes a friction disk in engagement with the drive disk for transmitting rotation of the drive disk to the pair of wheels, and a carrier disk coupled to the friction disk for rotation therewith. The utility machine also includes a shifter mechanism including a bearing that contacts a face of the friction disk to move the friction disk assembly with respect to the drive disk to selectively vary a drive speed of the pair of wheels.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
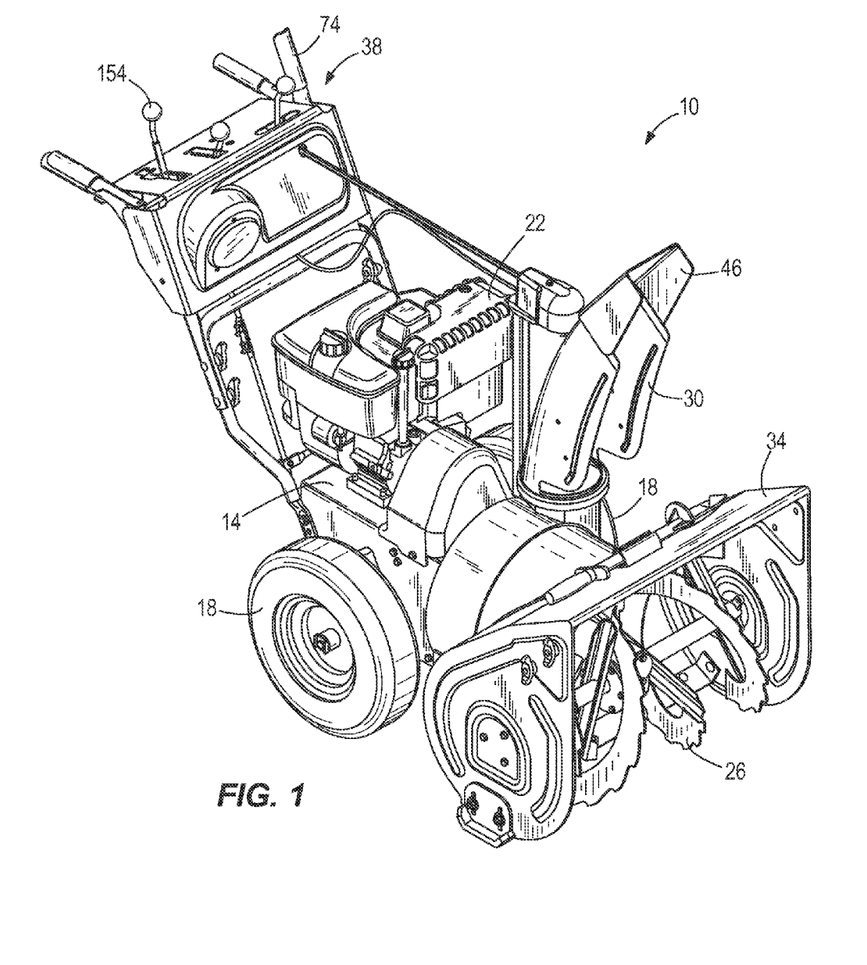
FIG. 1 is a front perspective view of a snow thrower embodying the invention.

FIG. 1 illustrates a utility machine 10. In the illustrated embodiment, the utility machine is a snow thrower, which may also be referred to as a snow blower. The snow thrower 10 includes a frame 14, a plurality of wheels 18, a prime mover 22, an auger 26, and a chute 30. The frame 14 includes an auger housing 34 and an operator control assembly 38. The operator control assembly 38 extends from the frame 14 in a direction opposite the auger housing 34 and includes controls to operate the snow thrower 10. The operator control assembly 38 is also configured to be grasped by an operator to move and maneuver the snow thrower 10 along a surface. The wheels 18 are rotatably coupled to the frame 14 by an axle 42 (FIGS. 2-3) to facilitate moving the snow thrower 10 along the surface.

The prime mover 22 is supported by the frame 14 between the auger housing 30 and the operator control assembly 34. The illustrated prime mover 22 includes a two-stroke or four-stroke internal combustion engine that is coupled to the auger 26 to drive the auger 26. The prime mover 22 is also coupled to the wheels 18 to drive the wheels 18. In other embodiments, the prime mover 22 may include a battery-powered electric motor. In some embodiments, the snow thrower 10 may include separate prime movers for driving the auger 26 and the wheels 18.

The auger 26 is positioned within the auger housing 34 and coupled to the prime mover 22. The auger 26 is operable to be driven (e.g., rotated) by the prime mover 22 to draw snow into the auger housing 34 and push the snow through the chute 30. The illustrated snow thrower 10 is a two-stage snow thrower including a secondary impeller or fan adjacent the chute 30 that is driven by the prime mover 22 and that throws snow out through the chute 30. In other embodiments, the snow thrower 10 may be a single-stage snow thrower, in which the auger 26 both draws snow in and pushes snow out of the snow thrower 10 through the chute 30.

The chute 30 is mounted to the frame 14 to direct snow and other material away from the frame 14. The illustrated chute 30 is rotatably mounted above the auger housing 34 of the frame 14. In other embodiments, the chute 30 may be located elsewhere on the frame 14. The chute 30 is rotatable relative to the frame 14 to discharge snow in different directions, as desired by an operator of the snow thrower 10. The chute 30 also includes a deflector 46 that is manually pivotable to change the arc at which snow is discharged from the chute 26. The axis of rotation of the chute 30 is substantially perpendicular to the axis of the wheel axle 42, and the pivot axis of the deflector 46 is substantially perpendicular to the axis of rotation of the chute 30.

Figure 2:
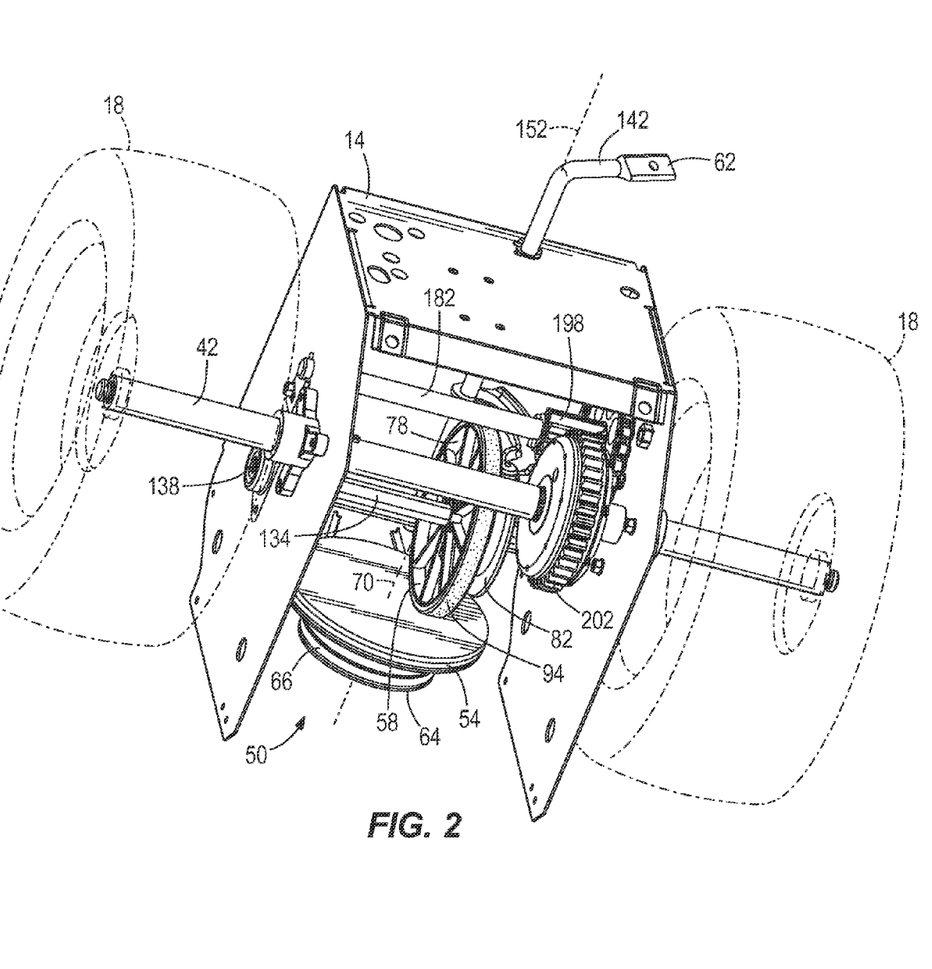
FIG. 2 is a bottom perspective view of a portion of the snow thrower, the snow thrower including a friction drive system.
Figure 3:
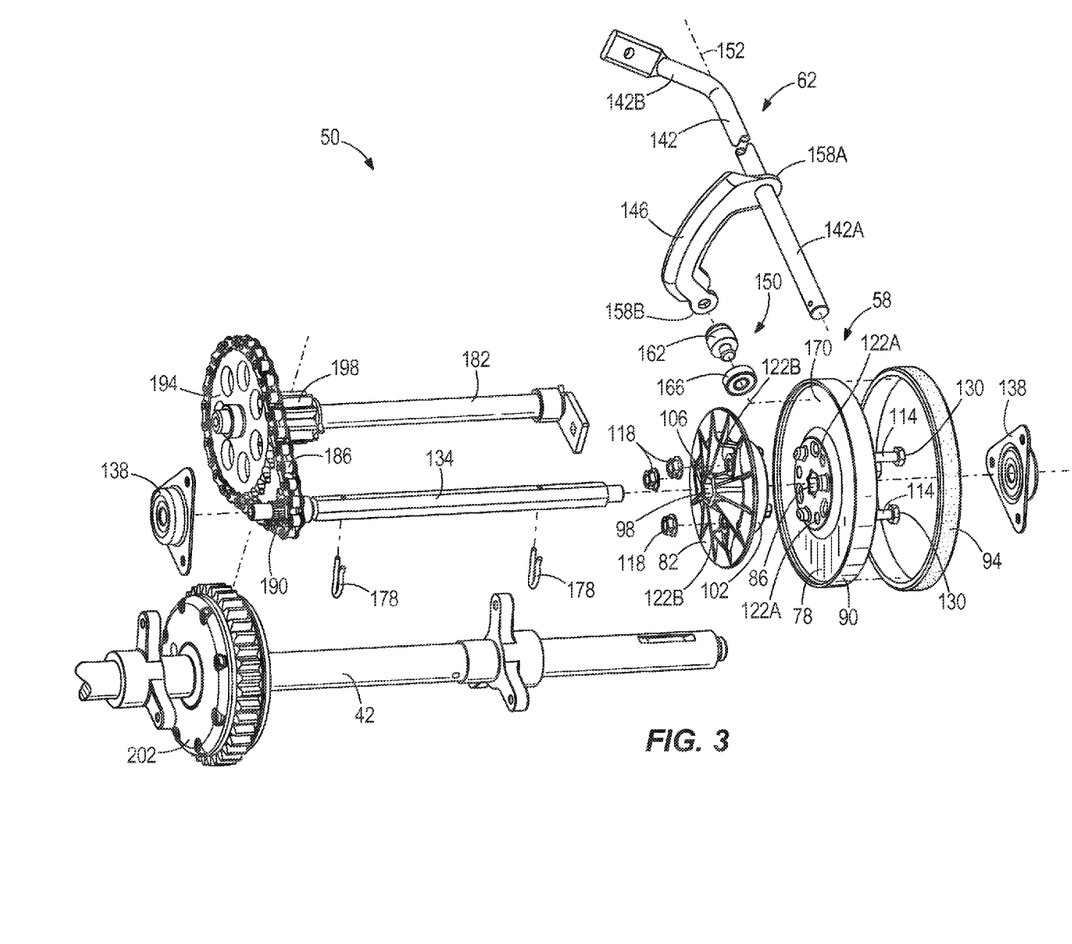
FIG. 3 is an exploded view of the friction drive system.

As shown in FIGS. 2 and 3, the snow thrower 10 includes a friction drive system 50. In the illustrated embodiment, the friction drive system 50 is supported by the frame 14 generally beneath the prime mover 22. The friction drive system 50 is operable to transfer motive force from the prime mover 22 to the wheels 18 to drive rotation of the wheels 18. The friction drive system 50 is also adjustable by an operator to change the speed and/or direction in which the wheels 18 are driven by the prime mover 22.

The illustrated friction drive system 50 includes a drive disk 54, a friction disk assembly 58, and a shifter mechanism 62. Referring to FIG. 2, a sheave 64 is rigidly mounted to the drive disk 54. A belt 66 is received in the sheave 64 and is operatively coupled to a power output the prime mover 22 (e.g., the power takeoff shaft or "PTO" of an engine) such that the sheave 64 and drive disk 54 rotate under the influence of the prime mover 22. In some embodiments, the sheave 64 may be omitted so that the belt 66 wraps around and engages a groove formed in the outer diameter of the drive disk 54. In other embodiments, the drive disk 54 may be directly coupled to the power output of the prime mover 22 or may be coupled to and driven by the prime mover 22 using other suitable drive mechanisms (e.g., gears, etc.). When driven by the prime mover 22, the drive disk 54 rotates about an axis 70. The axis 70 extends through a center of the drive disk 54.

The drive disk 54 is movable into and out of contact with the friction disk assembly 58. When the drive disk 54 contacts the friction disk assembly 58 (as shown in FIG. 2), rotation is transferred from the drive disk 54 to the friction disk assembly 58. In this state, the friction drive system 50 is in drive to transmit motion and power from the prime mover 22 to the wheels 18. When the drive disk 54 is moved out of contact with the friction disk assembly 58, the friction drive system 50 is in neutral so that motion is not transferred from the prime mover 22 to the wheels 18, or from the wheels 18 to the prime mover 22.

In the illustrated embodiment, the drive disk 54 is movable along the axis 70 into and out of contact with the friction disk assembly 58. The drive disk 54 is operatively coupled to one of the controls (e.g., a lever 74) on the operator control assembly 38 (FIG. 1). Actuating (e.g., squeezing) the lever 74 actuates a linkage or cable to move the drive disk 54 toward the friction disk assembly 58. In some embodiments, the drive disk 54 may be biased by a spring or other biasing member away from the friction disk assembly 58. In such embodiments, when the lever 74 is released, the drive disk 54 automatically moves away from and out of contact with the friction disk assembly 58. In other embodiments, the drive disk 54 may be moved by other suitable means, such as an electronic button or switch.

Referring to FIG. 3, the illustrated friction disk assembly 58 includes a friction disk 78 and a carrier disk 82. The friction disk 78 is a generally circular member having a central aperture 86 and an outer perimeter 90. The friction disk assembly 58 also includes a friction ring 94 formed on or coupled to the outer perimeter 90 of the friction disk 78. The friction ring 94 contacts the drive disk 54 to transmit motion from the drive disk 54 to the friction disk assembly 58. In the illustrated embodiment, the friction ring 94 is a separate member that is secured to the friction disk 78. The illustrated friction disk 78 is composed of a relatively rigid material, and the friction ring 94 is composed of a relatively soft material with a high coefficient of friction. For example, the friction disk 78 may be metal or plastic, and the friction ring 94 may be rubber (similar to a tire). Forming the friction disk 78 of plastic facilitates manufacturing the friction disk 78 using, for example, injection molding. The friction ring 94 can be molded onto the outer perimeter 90 of the friction disk 78 during the injection molding process or during a separate process. In other embodiments, the friction ring 94 may be integrally formed as a single piece with the friction disk 78 (e.g., the friction ring 94 may be the outer perimeter 90 of the friction disk 78). In such embodiments, the friction ring 94 may be a roughened or textured surface that increases the coefficient of friction of the outer perimeter 90.

The carrier disk 82 is also a generally circular member having a central aperture 98. Similar to the friction disk 78, the illustrated carrier disk 82 is composed of a relatively rigid material (e.g., injection molded plastic). The carrier disk 82 includes a flange 102 extending axially from one side of the disk 82, and a central boss 106 extending axially from an opposite side of the disk 82. The flange 102 engages the friction disk 78 to form a gap 110 (FIG. 5) between the friction disk 78 and the carrier disk 82. As discussed below, the gap 110 is sized to receive a portion of the shifter mechanism 62.

The carrier disk 82 is coupled to the friction disk 78 for movement with the friction disk 78. In the illustrated embodiment, the carrier disk 82 is secured to the friction disk 78 with threaded fasteners (e.g., bolts 114 and nuts 118). The bolts 114 extend through bores 122A, 122B in the friction disk 78 and the carrier disk 82 and are secured in place by the nuts 118. In other embodiments, the friction disk 78 and the carrier disk 82 may be secured together using other suitable coupling means, such as rivets.

Figure 4:
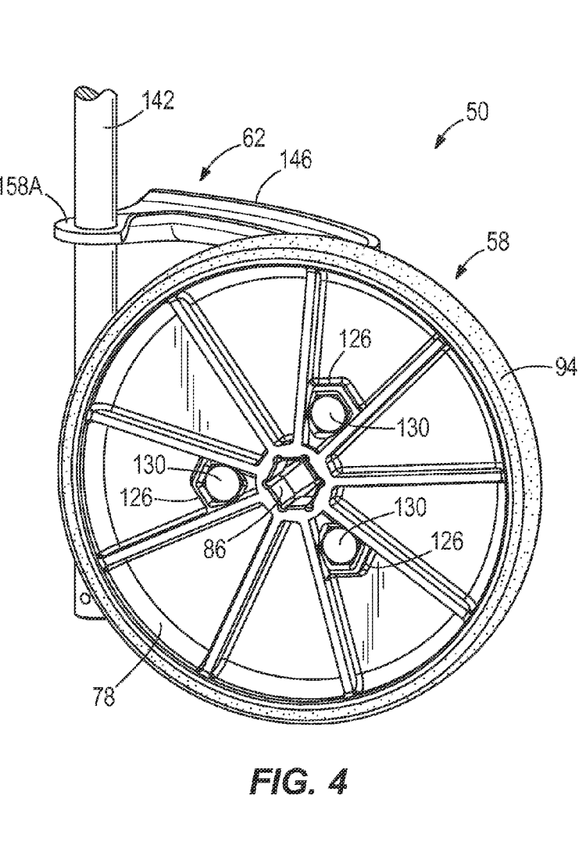
FIG. 4 is a perspective view of a portion of the friction drive system.
Figure 5:
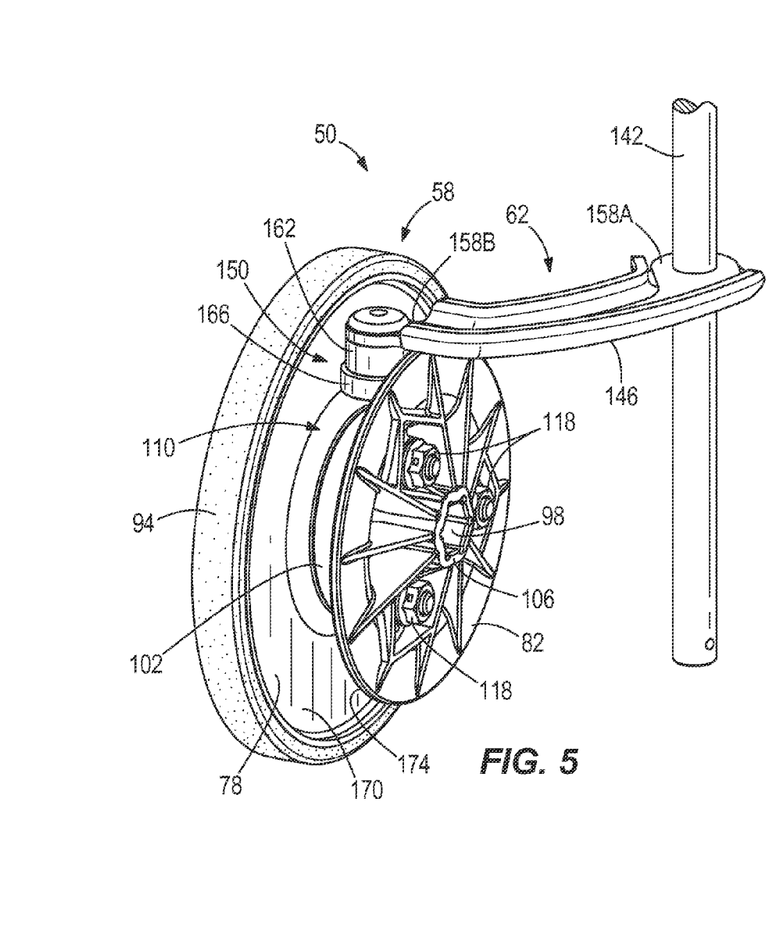
FIG. 5 is another perspective view of the portion of the friction drive system.

The friction disk 78 and the carrier disk 82 are configured so the bolts 114 and the nuts 118 do not protrude obtrusively from the friction disk assembly 58. As shown in FIG. 4, the friction disk 78 includes hexagonal bosses 126 that receive heads 130 of the bolts 114. The bosses 126 provide recesses so that the heads 130 do not extend outwardly beyond a profile of the friction disk 78 (when the friction disk 78 is viewed along its edge). The bosses 126 also engage the heads 130 to inhibit rotation of the bolts 114 relative to the friction disk 78. This arrangement facilitates assembly of the friction disk assembly 58 by holding the bolts 114 in place when tightening the nuts 118. As shown in FIG. 5, the central boss 106 of the carrier disk 82 extends outwardly a further axial distance than the nuts 118 so that the nuts 118 are recessed relative to the boss 106. The nuts 118, therefore, do not extend outwardly beyond a profile of the carrier disk 82 (when the carrier disk 82 is viewed along its edge).

Referring back to FIG. 3, the friction disk 78 and the carrier disk 82 are supported by a first shaft 134 of the snow thrower 10. The first shaft 134, or friction disk shaft, is rotatably coupled to the frame 14. A bearing 138 is located at each end of the shaft 134 to facilitate rotating the shaft 134 relative to the frame 14. The illustrated shaft 134 has a hexagonal cross-section. The hexagonal cross-section matches the shape and size of the apertures 86, 98 in the friction disk 78 and the carrier disk 82 so that the shaft 134 is rotationally coupled to and rotates with the friction disk assembly 58. In addition, the extended length of the central boss 106 (relative to the rest of the carrier disk 82) helps stabilize the friction disk assembly 58 on the first shaft 134 as the friction disk assembly 58 slides along the shaft 134. In other embodiments, the shaft 134 and the apertures 86, 98 may have other suitable shapes to inhibit rotation between the friction disk assembly 58 and the shaft 134.

The friction disk assembly 58 moves (e.g., slides) axially along the first shaft 134 by actuating the shifter mechanism 62. As shown in FIG. 3, the illustrated shifter mechanism 62 includes an actuator shaft 142, a shifter arm 146, and a bearing assembly 150. The actuator shaft 142 includes a long, straight portion 142a that defines an axis of rotation 152, and a curved portion 142b extending from the straight portion 142a. The straight portion 142A is supported by bearings interconnected to the frame 14, such that the entire actuator shaft 142 can rotate with respect to the frame 14 about the axis of rotation 152. In the illustrated embodiment, the axis of rotation 152 of the shaft 142 is generally parallel to the axis of rotation 70 of the drive disk 54. The curved portion 142b of the actuator shaft 142 is coupled to a speed control lever 154 (FIG. 1) of the operator control assembly 38. The actuator shaft 142 may be coupled to the speed control lever 154 by a cable, linkage, or other suitable mechanism to transmit movement of the speed control lever 154 to the actuator shaft 142. In the illustrated embodiment, actuating the speed control lever 154 rotates the shaft 142 to move the shifter arm 146 and the bearing assembly 150 within the frame 14. In other embodiments, the shaft 142 may be rotated by other suitable means, such as a dial or an electronic button or switch.

The shifter arm 146 is coupled to and extends radially outward from the actuator shaft 142. The illustrated shifter arm 146 includes a first end 158A and a second end 158B. The first end 158A is secured to the actuator shaft 142 so that the shifter arm 146 rotates with the actuator shaft 142 about the axis of rotation 152. The second end 158B is a free or distal end on which the bearing assembly 150 is mounted. In the illustrated embodiment, the shifter arm 146 is at least partially curved between the first and second ends 158A, 158B, although other shifter arm configurations are also contemplated.

The illustrated bearing assembly 150 includes a support 162 and a bearing 166. The support 162 is coupled to the second end 158B of the shifter arm 146 for movement with the shifter arm 146. The bearing 166 is coupled to the support 162 for rotation relative to the support 162. The bearing 166 may be composed of a wear-resistant, low-friction material such as metal or high-density plastic. In some embodiments, the bearing 166 may be replaced with a stationary (i.e., non-rotatable) member that is coupled to the second end 158B of the shifter arm 146.

As shown in FIG. 5, the bearing 166 is received within the gap 110 between the friction disk 78 and the carrier disk 82. More particularly, the bearing 166 is positioned directly between the friction disk 78 and the carrier disk 82 so that no other structures are located between the bearing 166 and the friction disk 78, and between the bearing 166 and the carrier disk 82. In other words, the bearing 166 is captured between a face 170 of the friction disk 78 and a face 174 of the carrier disk 82. The bearing 166 contacts and pushes against the face 170 of the friction disk 78 to move (e.g., axially slide) the friction disk assembly 58 along the first shaft 134 in a first direction. Similarly, the bearing 166 contacts and pushes against the face 174 of the carrier disk 82 to move (e.g., axially slide) the friction disk assembly 58 along the first shaft 134 in a second direction. Moving the friction disk assembly 58 along the shaft 134 changes the position of the friction disk assembly 58 relative to the drive disk 54 (FIG. 2), which changes the drive speed of the wheels 18 (FIG. 1).

In the illustrated embodiment, the extent of movement of the friction disk assembly 58 along the first shaft 134 is limited by two pins 178. The pins 178 are located proximate ends of the shaft 134, but are positioned inward of the bearings 138. The friction disk assembly 58 is located between the pins 178. The pins 178 act as stops to limit the range of motion of the friction disk assembly 58 along the length of the shaft 134. In the illustrated embodiment, the pins 178 are cotter pins that extend through and are removable from the shaft 134. Removing the pins 178 facilitates assembly and maintenance of the friction drive system 58. In other embodiments, at least one of the pins 178 may be a projection that is permanently formed or fixed on the shaft 134.

Rotation of the friction disk assembly 58 is transmitted to the wheels 18 through the first shaft 134, a second shaft 182, and the axle 42. Similar to the first shaft 134, the second shaft 182 is rotatably coupled to the frame 14. The first shaft 134, the second shaft 182, and the axle 42 all rotate about axes that are generally parallel to each other, but are generally perpendicular to the axis 70 of the drive disk 54. In the illustrated embodiment, the first shaft 134 is coupled to and drives (e.g., rotates) the second shaft 182 via a chain 186. A first sprocket 190 is fixed to the first shaft 134 for rotation with the first shaft 134. A second sprocket 194 is fixed to the second shaft 182 for rotation with the second shaft 182. The chain 186 engages the sprockets 190, 194 to transmit rotation from the first shaft 134 to the second shaft 182. The illustrated second sprocket 194 is larger than the first sprocket 190 to create a desired speed reduction. In other embodiments, the first and second sprockets 190, 194 may have different configurations (e.g., relative sizes) to create different speed reduction ratios between the first shaft 134 and the second shaft 182. In further embodiments, the second shaft 182 may be coupled to the first shaft 134 using other suitable drive mechanisms (e.g., a belt, gears, etc.).

The second shaft 182, or intermediate shaft, is coupled to and drives (e.g., rotates) the axle 42 via gears 198, 202. The first gear 198 is fixed to the second shaft 182 for rotation with the second shaft 182. In the illustrated embodiment, the first gear 198 is positioned proximate the second sprocket 194 (i.e., generally at the same end of the shaft 182), although in other embodiments, the first gear 198 may be positioned elsewhere on the second shaft 182. The second gear 202 is fixed to the axle 42 for rotation with the axle 42. The first gear 198 engages the second gear 202 to transmit rotation from the second shaft 182 to the axle 42. The illustrated second gear 202 is larger than the first gear 198 to create a desired speed reduction. In other embodiments, the first and second gears 198, 202 may have different configurations (e.g., relative sizes) to create different speed reduction ratios between the second shaft 182 and the axle 42. In further embodiments, the second shaft 182 may be coupled to the axle 42 using other suitable drive mechanisms (e.g., a belt, a chain, etc.).

In other embodiments, the first shaft 134 may be directly coupled to the axle 42 to drive the axle 42 via a single reduction drive system. In such embodiments, the first shaft 134 may be coupled to the axle 42 via gears, a belt, a chain, or the like. In addition, the second shaft 182 and the chain 186 may be omitted.

In operation, motive force is transmitted from the prime mover 22 to the wheels 18 as follows. Referring to FIG. 2, the prime mover 22 rotates the drive disk 54 via the sheave 64 and the belt 66. When moved into drive, the drive disk 54 contacts the friction disk assembly 58 to rotate the friction disk assembly 58. As the friction disk assembly 58 rotates, the assembly 58 rotates the first shaft 134, which rotates the second shaft 182 via the sprockets 190, 194 and the chain 186. The second shaft 182 in turn rotates the axle 42 via the gears 198, 202. The axle 42 rotates the wheels 18 to move the snow thrower 10 along a surface.

The speed of the snow thrower 10 is adjustable by changing the location at which the friction disk assembly 58 contacts the drive disk 54. Varying the location of the friction disk assembly 58 relative to the drive disk 54 changes the speed at which the friction disk assembly 58 rotates and, thereby, the speed at which the wheels 18 rotate. The shifter mechanism 62 is operable to move the point at which the friction disk assembly 58 contacts the drive disk 54, herein referred to as the "contact point." The speed at which the friction disk assembly 58 rotates is determined by the distance between the contact point and the center (i.e., the axis 70) of the drive disk 54. The further the contact point is from the axis 70, the faster the friction disk assembly 58 rotates. The closer the contact point is to the axis 70, the slower the friction disk assembly 58 rotates.

Figures 6, 7:
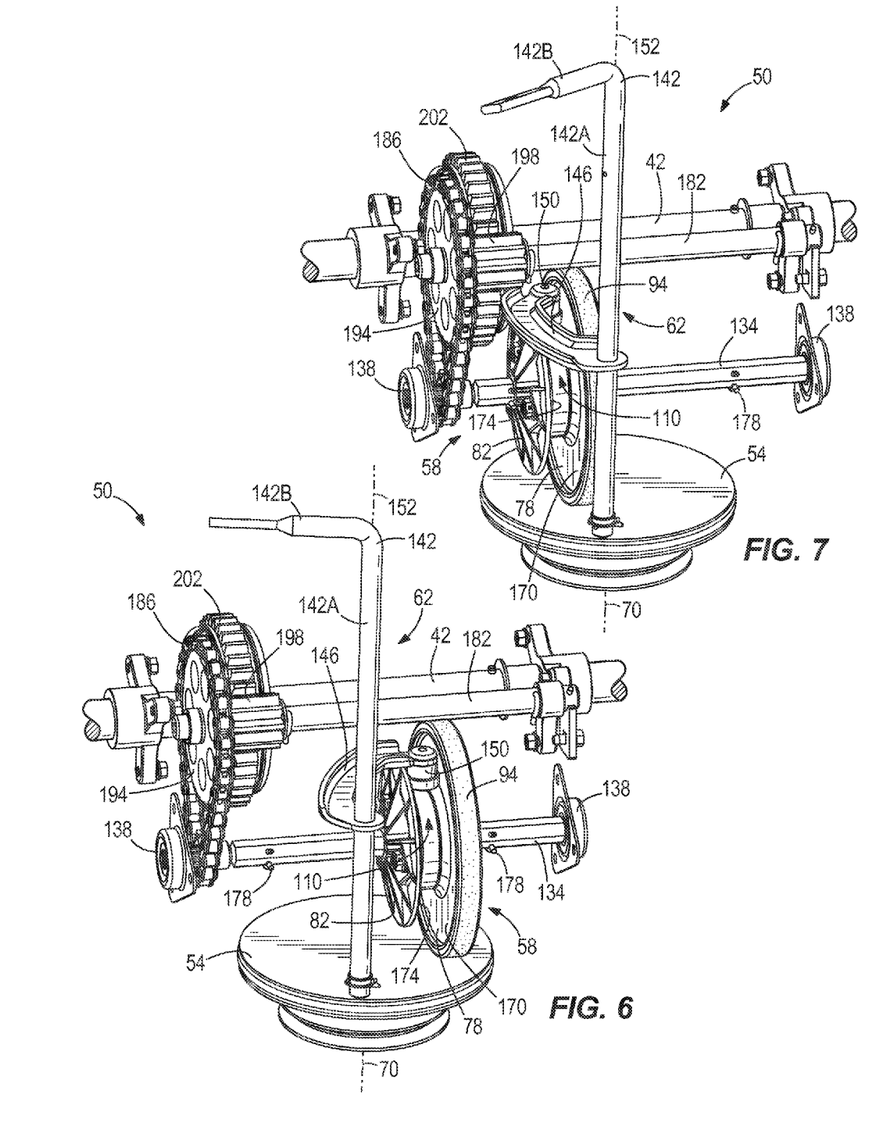
FIG. 6 is a perspective view of the friction drive system, illustrating a friction disk assembly in a first position relative to a drive disk.
FIG. 7 is a perspective view of the friction drive system, illustrating the friction disk assembly in a second position relative to the drive disk.

Referring to FIG. 6, when moving in a forward direction, an operator adjusts the speed of the snow thrower 10 by actuating the speed control lever 154 (FIG. 1) to rotate the actuator shaft 142. When the actuator shaft 142 is rotated, the shifter arm 146 is also rotated. Rotating the actuator shaft 142 in a first direction (e.g., clockwise in FIG. 6) causes the bearing 166 coupled to the shifter arm 146 to push against the face 170 of the friction disk 78 and move the friction disk assembly 58 away from the axis 70 of the drive disk 54 (e.g., to the right in FIG. 6). As the contact point of the friction disk assembly 58 moves closer to the outer edge of the drive disk 54, the speed of rotation of the friction disk assembly 58, and thereby of the wheels 18, increases. In contrast, rotating the actuator shaft 142 in a second direction (e.g., counterclockwise in FIG. 6) causes the bearing 166 coupled to the shifter arm 146 to push against the face 174 of the carrier disk 82 and move the friction disk assembly 58 toward the axis 70 of the drive disk 54 (e.g., to the left in FIG. 6). As the contact point of the friction disk assembly 58 moves closer to the axis 70 of the drive disk 54, the speed of rotation of the friction disk assembly 58, and thereby of the wheels 18, decreases. In other embodiments, the orientation of the friction disk 78 and the carrier disk 82 may be reversed so that pushing against the carrier disk 82 increases the speed of the wheels 18, and pushing against the friction disk 78 decreases the speed of the wheels 18.

If the contact point of the friction disk assembly 58 crosses over the axis 70 of the drive disk 54, as shown in FIG. 7, the direction of rotation of the friction disk assembly 58 reverses. Similar to the speed adjustment discussed above, further movement of the contact point away from the axis 70 of the drive disk 54 causes the friction disk assembly 58, and thereby the wheels 18, to rotate at a faster speed in reverse. Movement of the contact point toward the axis 70 of the drive disk 54 causes the friction disk assembly 58, and thereby the wheels 18, to rotate at a slower speed in reverse.

Positioning the bearing 166 of the shifter mechanism 62 directly between the friction disk 78 and the carrier disk 82 reduces the number of parts and complexity of the friction drive system 50. This arrangement also facilitates assembling the friction drive system 50. For example, referring to FIG. 3, one or both of the pins 178 is first removed from the shaft 134 during assembly. The friction disk 78 and the carrier disk 82 (while separated) are then slid onto the shaft 134. After the disks 78, 82 are positioned on the shaft 134, the pin(s) 178 is/are reinserted into the shaft 134. Before the disks 78, 82 are secured together, the bearing 166 of the shifter mechanism 62 is positioned between the disks 78, 82. A user can easily move the bearing 162 between the disks 78, 82 by sliding the disks 78, 82 apart along the shaft 134 and rotating the shifter arm 146 so that the bearing 166 is between the spread-apart disks 78, 82. Once the bearing 166 is located between the disks 78, 82, the friction disk 78 and the carrier disk 82 are slid together to capture the bearing 166 therebetween. The carrier disk 82 is then secured to the friction disk 78 by inserting the bolts 114 through the disks 78, 82, and securing the bolts 114 with the nuts 118.

Alternatively, the friction drive system 50 may be assembled without disconnecting (e.g., unbolting) the carrier disk 82 from the friction disk 78. One or both of the pins 178 can be removed from the shaft 134 so that the friction disk assembly 58 can be slid beyond points where the pin(s) 178 were located. If the friction disk assembly 58 is slid far enough away from the actuator shaft 142, the bearing 166 can be slid into (or fall out of) the gap 110 between the disks 78, 82. The friction disk assembly 58 can then be slid back toward the actuator shaft 142, and the pin(s) 178 can be replaced.

Positioning the bearing 166 between the disks 78, 82 before the disks 78, 82 are secured together also simplifies connecting the shifter mechanism 62 to the friction disk assembly 58. In particular, this arrangement allows the shifter mechanism 62 to be connected to or disconnected from the friction disk assembly 58 while both the shifter mechanism 62 and the friction disk assembly 58 are positioned within the frame 14 (and without requiring disassembly and later assembly of the shifter mechanism 62). As such, a user can more easily clean or replace parts (e.g., the bearing 166) without taking apart the entire friction drive system 50.

In the illustrated embodiment, the friction drive system 50 is configured to drive the wheels 18 of the snow thrower 10. In some embodiments, the friction drive system 50 may also or alternatively drive the auger 26 of the snow thrower 10. In embodiments where the utility machine 10 is a different type of machine (e.g., a lawn mower), the friction drive system 50 may drive another work implement (e.g., a cutting blade). In these alternative embodiments, the first shaft 134 may be operatively coupled to the auger 26 (or other work implement) by a mechanical linkage or other suitable coupling means.

Although the invention has been described with reference to certain preferred embodiments, variations and modifications exist within the scope and spirit of one or more independent aspects of the invention. Various features and advantages of the invention are set forth in the following claims.

What is claimed is:

1. A utility machine comprising:
  a frame;
  a prime mover supported by the frame;
  a pair of wheels rotatably coupled to the frame;
  a drive disk coupled to the prime mover to be driven by the prime mover;
  a friction disk assembly including
    a friction disk in engagement with the drive disk, the friction disk transmitting rotation of the drive disk to the pair of wheels, and
    a carrier disk coupled to the friction disk for rotation therewith; and
  a shifter mechanism including a bearing disposed directly between the friction disk and the carrier disk, the shifter mechanism operable to move the friction disk assembly with respect to the drive disk to selectively vary a drive speed of the pair of wheels.

2. The utility machine of claim 1, wherein the friction disk and the carrier disk of the friction disk assembly are secured together by a bolt.

3. The utility machine of claim 2, wherein the friction disk includes a recess that receives a head of the bolt.

4. The utility machine of claim 3, wherein the recess is defined by a hexagonal boss that engages the head of the bolt to inhibit rotation of the bolt with respect to the friction disk.

5. The utility machine of claim 1, wherein the friction disk assembly further includes a friction ring positioned on an outer diameter of the friction disk, and wherein the friction ring contacts the drive disk.

6. The utility machine of claim 5, wherein the friction disk is composed of plastic, and wherein the friction ring is composed of rubber molded onto the outer diameter of the friction disk.

7. The utility machine of claim 1, further comprising a first shaft rotatably supported by the frame, wherein the friction disk assembly is slidably received on the first shaft.

8. The utility machine of claim 7, wherein the first shaft has a hexagonal cross-section.

9. The utility machine of claim 7, wherein the bearing of the shifter mechanism engages the friction disk assembly to slide the friction disk assembly along the first shaft and move the friction disk assembly with respect to the drive disk.

10. The utility machine of claim 9, wherein the bearing of the shifter mechanism contacts a face of the friction disk to slide the friction disk assembly along the first shaft.

11. The utility machine of claim 7, further comprising a second shaft rotatably supported by the frame, wherein the second shaft is coupled to the first shaft by a chain.

12. The utility machine of claim 11, further comprising:
an axle rotatably supported by the frame and coupled to the pair of wheels;
a first gear fixed to the second shaft for rotation with the second shaft; and
a second gear fixed to the axle for rotation with the axle, the second gear engaging the first gear.

13. The utility machine of claim 1, wherein the bearing of the shifter mechanism contacts a face of the friction disk to move the friction disk assembly with respect to the drive disk.

14. The utility machine of claim 1, wherein the shifter mechanism further includes a shifter arm and an actuator shaft, and wherein the shifter arm includes a first end that is secured to the actuator shaft and a second end that is rotatably coupled to the bearing.

15. The utility machine of claim 1, wherein the utility machine is a snow thrower.

16. A utility machine comprising:
a frame;
a prime mover supported by the frame;
a pair of wheels rotatably coupled to the frame;
a drive disk coupled to the prime mover to be driven by the prime mover;
a friction disk assembly including
a friction disk in engagement with the drive disk, the friction disk transmitting rotation of the drive disk to the pair of wheels, and
a carrier disk coupled to the friction disk for rotation therewith; and
a shifter mechanism including a bearing that contacts a face of the friction disk to move the friction disk assembly with respect to the drive disk to selectively vary a drive speed of the pair of wheels.

17. The utility machine of claim 16, wherein the friction disk is composed of plastic, wherein the friction disk assembly further includes a friction ring composed of rubber molded onto an outer diameter of the friction disk, and wherein the friction ring contacts the drive disk.

18. The utility machine of claim 16, further comprising a first shaft rotatably supported by the frame, wherein the friction disk assembly is slidably received on the first shaft.

19. The utility machine of claim 18, further comprising:
a second shaft rotatably supported by the frame, the second shaft being coupled to the first shaft by a chain;
an axle rotatably supported by the frame and coupled to the pair of wheels;
a first gear fixed to the second shaft for rotation with the second shaft; and
a second gear fixed to the axle for rotation with the axle, the second gear engaging the first gear.

20. The utility machine of claim 16, wherein the bearing is disposed directly between the friction disk and the carrier disk.

* * * * *